US008579073B2

(12) United States Patent
Sheng et al.

(10) Patent No.: US 8,579,073 B2
(45) Date of Patent: Nov. 12, 2013

(54) ACOUSTIC ENERGY ABSORPTION METAMATERIALS

(71) Applicant: The Hong Kong University of Science and Technology, Hong Kong (CN)

(72) Inventors: Ping Sheng, Hong Kong (CN); Zhiyu Yang, Hong Kong (CN); Weijia Wen, Hong Kong (CN); Jun Mei, Guangzhou (CN); Guancong Ma, Hong Kong (CN)

(73) Assignee: The Hong Kong University of Science and Technology, Kowloon, Hong Kong (CN)

( * ) Notice: Subject to any disclaimer, the term of this patent is extended or adjusted under 35 U.S.C. 154(b) by 0 days.

(21) Appl. No.: 13/687,436

(22) Filed: Nov. 28, 2012

(65) Prior Publication Data

US 2013/0133979 A1 May 30, 2013

Related U.S. Application Data

(60) Provisional application No. 61/629,869, filed on Nov. 30, 2011.

(51) Int. Cl.
*F16F 7/00* (2006.01)

(52) U.S. Cl.
USPC .......... 181/207

(58) Field of Classification Search
USPC .......... 181/207
See application file for complete search history.

(56) References Cited

U.S. PATENT DOCUMENTS

| | | | | |
|---|---|---|---|---|
| 2,270,825 | A | 1/1942 | Parkinson et al. | |
| 2,541,159 | A * | 2/1951 | Geiger | 181/208 |
| 4,194,329 | A | 3/1980 | Wendt | |
| 4,325,461 | A | 4/1982 | Bschorr | |
| 4,373,608 | A * | 2/1983 | Holmes | 181/202 |
| 4,425,981 | A | 1/1984 | Kiesewetter | |
| 5,241,512 | A * | 8/1993 | Argy et al. | 367/1 |
| 5,543,198 | A | 8/1996 | Wilson | |
| 5,545,861 | A | 8/1996 | Morimoto | |
| 5,629,503 | A * | 5/1997 | Thomasen | 181/199 |
| 5,670,758 | A * | 9/1997 | Borchers et al. | 181/286 |
| 7,249,653 | B2 * | 7/2007 | Sheng et al. | 181/290 |

(Continued)

FOREIGN PATENT DOCUMENTS

| | | |
|---|---|---|
| EP | 0 495 763 A1 | 7/1992 |
| EP | 1 022 721 A2 | 7/2000 |

OTHER PUBLICATIONS

Sound Insulation of a Rectangular Thin Membrane with Additional Weights; Applied Acoustics 33 (1991) pp. 21-43—Hashimoto, Norihisa, Katsura, Mitsuhiro, Yasuoka, Masahito and Fujii, Hiroyosi.

(Continued)

*Primary Examiner* — Forrest M Phillips
(74) *Attorney, Agent, or Firm* — Nath, Goldberg & Meyer; Jerald L. Meyer; Stanley N. Protigal

(57) ABSTRACT

An acoustic energy absorption metamaterial includes at least one enclosed planar frame with an elastic membrane attached having one or more rigid plates are attached. The rigid plates have asymmetric shapes, with a substantially straight edge at the attachment to said elastic membrane, so that the rigid plate establishes a cell having a predetermined mass. Vibrational motions of the structure contain a number of resonant modes with tunable resonant frequencies.

8 Claims, 8 Drawing Sheets

(56) References Cited

U.S. PATENT DOCUMENTS

| | | | | |
|---|---|---|---|---|
| 7,267,196 | B2 | 9/2007 | Mathur | |
| 7,395,898 | B2 * | 7/2008 | Yang et al. | 181/286 |
| 8,025,124 | B2 | 9/2011 | Levit et al. | |
| 2002/0046901 | A1 | 4/2002 | Zapfe | |
| 2011/0100749 | A1 | 5/2011 | Nonogi et al. | |
| 2013/0025961 | A1 * | 1/2013 | Koh et al. | 181/207 |

OTHER PUBLICATIONS

Sound Insulation of a Membrane with Small Weights—sound insulation experiment on the experiment on the application to a membrane structure; Architectural Institute of Japan, J. Archit. Plann. Environ Eng. AIJ, No. 475, pp. 1-7, Sep. 1995—Hashimoto, Norihisa; Katsura, Mitsuhiro, Nishikawa, Yoshio; Katagihara, Kenichi; Torii, Tsuyoshi and Nakata, Makato.

Development of Sound-Insulationboard Consisting of a This Steel Plate and Additonal Small Weights; Architectural Institute of Japan, AIJ J, Technol. Des. No. 5, 142-146, Dec. 1997—Hashimoto, Norihisa; Nishikawa, Yoshio; Takahashi, Michiyasu; Katsura, Mitsuhiro; Sakoda, Akito and Kojima, Yukio.

Bradley W. Ross, "Attenuation of Low Frequency Structurally Radiated Noise with an Array of Weak Radiating Cells" Thesis to be submitted to the Faculty of the Virginia Polytechnic Institute and State University in partial fulfillment of the requirements for the degree of Master of Science in Mechanical Engineering, Feb. 1998.

Mei, et al., "Dark acoustic metamaterials as super absorbers for low-frequency sound," Nature Communications, (2012), fourteen (14) pages.

Naify, et al., "Membrane-type metamaterials: Transmission loss of multi-celled arrays," Journal of Applied Physics, (2011), vol. 109, pp. 104902-1-104902-9, ten (10) pages.

Naify, et al., "Transmission loss and dynamic response of membrane-type locally resonant acoustic metamaterials," Journal of Applied Physics, (2010), vol. 108, pp. 114905-1-114905-7, seven (7) pages.

Naify, et al., "Transmission loss of membrane-type acoustic metamaterials with coaxial ring masses," Journal of Applied Physics, (2011), vol. 110, pp. 124903-1-124903-8, nine (9) pages.

Yang, et al., "Acoustic metamaterial panels for sound attenuation in the 50-1000 Hz regime," Applied Physics Letters, (2010), vol. 96, pp. 041906-1-041906-3, three (3) pages.

Zhao, et al., "Low-frequency acoustic absorption of localized resonances: Experiment and theory," Journal of Applied Physics, (2010), vol. 107, pp. 023519-1-023519-5, five (5) pages.

* cited by examiner

ACOUSTIC ENERGY ABSORPTION METAMATERIALS

RELATED APPLICATION(S)

The present patent application claims priority to Provisional Patent Application No. 61/629,869 filed Nov. 30, 2011, which is assigned to the assignee hereof and filed by the inventors hereof and which is incorporated by reference herein.

BACKGROUND

1. Field

The present disclosure relates to novel energy absorption material, and in particular to absorb sound energy and to provide a shield or sound barrier. More specifically, the present disclosure relates to a dark acoustic metamaterial to act as a sound absorption system even though the system is geometrically open.

2. Background

The attenuation of low frequency sound has been a challenging task because the dynamics of dissipative systems are generally governed by the rules of linear response, which dictate the frictional forces and fluxes to be both linearly proportional to rates. It follows that the dissipative power is quadratic in rates, thereby accounting for the inherently weak absorption of low frequency sound waves by homogeneous materials. To enhance the dissipation at low frequencies it is usually necessary to increase the energy density inside the relevant material, e.g., through resonance.

SUMMARY

An acoustic energy absorption metamaterial is constructed with an enclosed planar frame and an elastic membrane attached to said frame. At least one rigid plate is attached to the elastic membrane and establishes a cell having a predetermined mass. The rigid plate has an asymmetric shape, with a substantially straight edge at the attachment to the elastic membrane. Vibrational motions of the structure contain a number of resonant modes with tunable resonant frequencies.

DETAILED DESCRIPTION

Overview

The term "metamaterials" denotes the coupling to the incident wave to be resonant in character. In an open system, radiation coupling to resonance is an alternative that can be effective in reducing dissipation. While the advent of acoustic metamaterials has broadened the realm of possible material characteristics, as yet there is no specific resonant structures targeting the efficient and subwavelength absorption of low frequency sound. In contrast, various electromagnetic metamaterials designed for absorption have been proposed, and an "optical black hole" has been realized by using metamaterials to guide the incident wave into a lossy core.

It has been found that by using thin elastic membranes decorated with designed patterns of rigid platelets, the resulting acoustic metamaterials can absorb 86% of the acoustic waves at ~170 Hz, with two layers absorbing 99% of the acoustic waves at the lowest frequency resonant modes, as well as at the higher frequency resonant modes. The sample is thus acoustically "dark" at those frequencies. Finite-element simulations of the resonant mode patterns and frequencies are in excellent agreement with the experiments. In particular, laser Doppler measurements of resonant modes' displacement show discontinuities in its slope around platelets' perimeters, implying significantly enhanced curvature energy to be concentrated in these small volumes that are minimally coupled to the radiation modes; thereby giving rise to strong absorption similar to a cavity system, even though the system is geometrically open.

It should be noted that the membrane-type metamaterials of the present subject matter differ from the previous works that were based on a different mechanism of anti-resonance occurring at a frequency that is in-between two eigenfrequencies, at which the structure is decoupled from the acoustic wave (and which also coincides with the diverging dynamic mass density), thereby giving rise to its strong reflection characteristic. Without coupling, there is naturally almost no absorption at the anti-resonance frequency. But even at the resonant eigenmode frequencies where the coupling is strong, the measured absorption is still low, owing to the strong coupling to the radiation mode that leads to high transmission. In contrast, for the dark acoustic metamaterials the high energy density regions couple minimally with the radiation modes, thereby leading to near-total absorption as in an open cavity.

In this arrangement, anti-resonances do not play any significant roles. The anti-resonances are essential in sound blocking, but are insignificant in sound absorption.

EXAMPLES

Figure 1A:
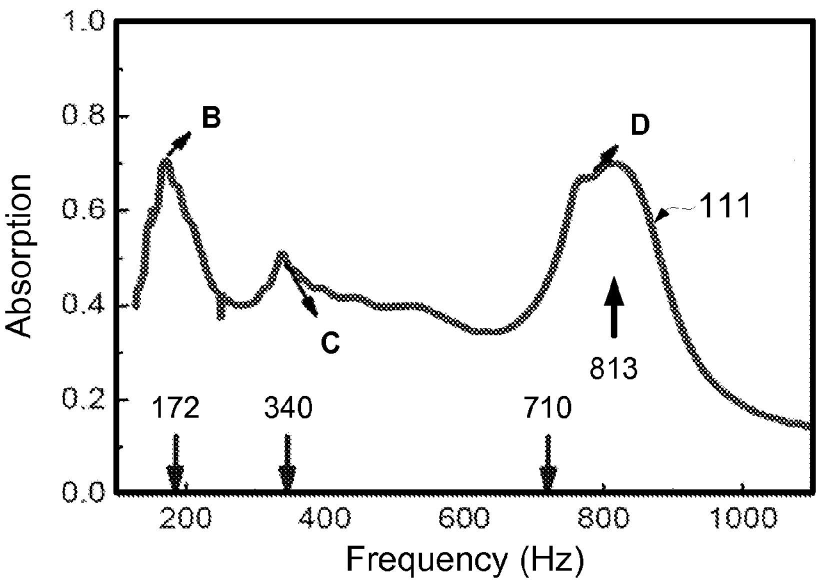
FIG. 1A is a graphical depiction of absorption properties of a unit cell.
Figure 1B:
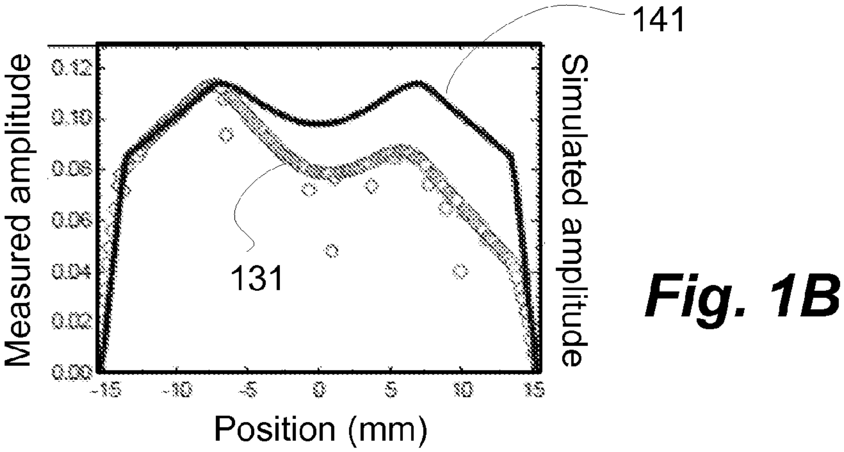
FIG. 1B is a graphical depiction of amplitude vs. position taken at 172 Hz. for the sample depicted in FIG. 1A.

FIG. 1A is a graphical depiction of absorption properties of a unit cell as shown in FIG. 1B. In FIG. 1A, curve 111 denotes the measured absorption coefficient for Sample A. There are three absorption peaks located at 172, 340, and 813 Hz, indicated by the arrows at the abscissa along the bottom of the graph. The arrows at 172, 340, and 710 Hz indicate the positions of the absorption peak frequencies predicted by finite-element simulations. The 813 Hz peak is the observed peak position obtained from experimental measurement appearing on curve 111 at "D". The arrow at 710 Hz indicates the theoretical peak position obtained by numerical calculation. Ideally the two values 710 Hz and 813 Hz should be the same, so the discrepancy indicates that the theoretical calculation is not an entirely accurate predictor of Sample A due to physical characteristics of the sample being modeled.

The unit cell of FIG. 1A comprises a rectangular elastic membrane that is 31 mm by 15 mm and 0.2 mm thick. The elastic membrane was fixed by a relatively rigid grid, decorated with two semi-circular iron platelets with a radius of 6 mm and 1 mm in thickness. The iron platelets are purposely made to be asymmetrical so as to induce "flapping" motion, as seen below. This results in a relatively rigid grid that can be regarded as an enclosed planar frame within the order of tens of centimeters to tens of meters. Moreover, the iron platelets can be replaced with any other rigid or semi-rigid plates with asymmetric shapes. The sample with this configuration is denoted Sample A, which in FIG. 1A is depicted in the xy plane, with the two platelets separated along they axis. Acoustic waves are incident along the z direction. This simple cell is used to understand the relevant mechanism and to compare with theoretical predictions.

Figure 1C:
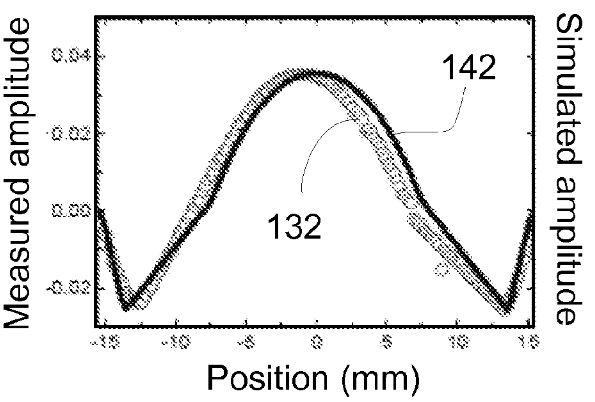
FIG. 1C is a graphical depiction of amplitude vs. position taken at 340 Hz. for the sample depicted in FIG. 1A.
Figure 1D:
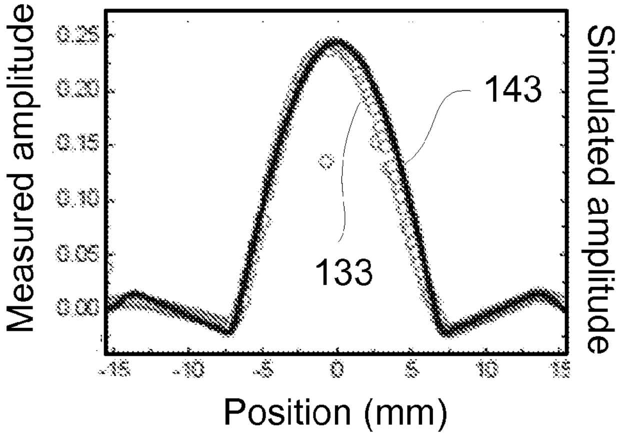
FIG. 1D is a graphical depiction of amplitude vs. position taken at 710 Hz. for the sample depicted in FIG. 1A.
Figure 1E:
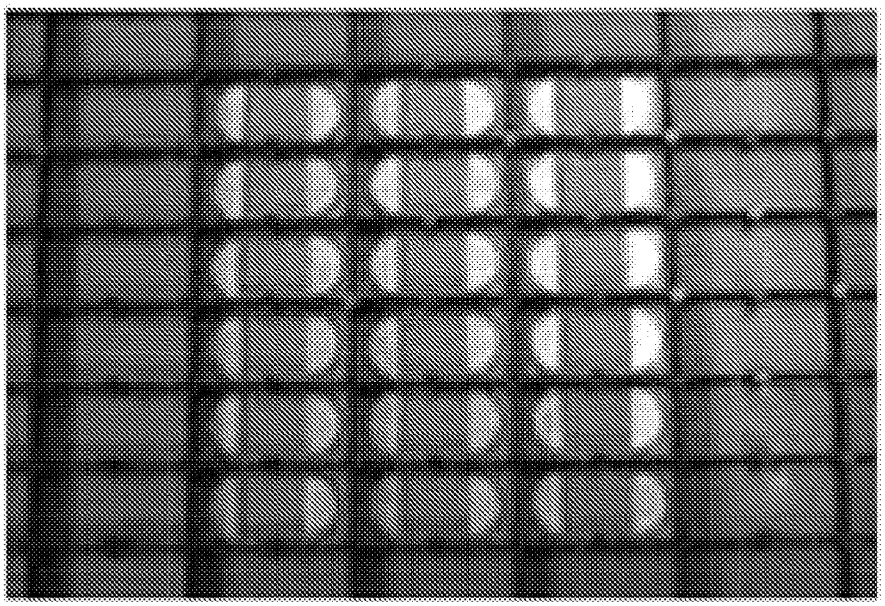
FIG. 1E is a photo image of the sample unit cell described in the graphs of FIGS. 1A-1D

Three cross-sectional profiles, representing vibrational patterns across the structure, are depicted in FIGS. 1B, 1C and 1D. The cross-sectional profiles are taken in along a central line, at graph locations B, C and D of FIG. 1A, respectively. The cross-sectional profiles depicted in FIGS. 1B, 1C and 1D are of w along the x axis of the unit cell. The straight sections ($7.5\ \text{mm} \le |x| \le 13.5\ \text{mm}$) of the profile indicate the positions of the platelets, which may be regarded as rigid. The cross-sectional profiles depicted in FIGS. 1B, 1C and 1D show chains of circles 131, 132, 133 denote the measured profile by laser vibrometer. Also shown in the insets are solid line curves 141, 142, 143, which are the finite-element simulation results. A photo image of Sample A is shown in FIG. 1E.

Measured absorption as a function of frequency for Sample A is shown in FIG. 1A, where it can be seen that there are 3 absorption peaks around 172, 340, and 813 Hz. Perhaps the most surprising is the absorption peak at 172 Hz, at which more than 70% of the incident acoustic wave energy has been dissipated, a very high value by such a 200 μm membrane at such a low frequency, where the relevant wavelength in air is about 2 meters. FIG. 1A shows this phenomenon arising directly from the profiles of the membrane resonance.

The arrows in FIG. 1A at 172, 340, and 710 Hz indicate the calculated absorption peak frequencies. The Young's modulus and Poisson's ratio for the rubber membrane are $1.9\times10^6$ Pa and 0.48, respectively.

In experiments, the membrane is made of silicone rubber Silastic 3133. The Young's modulus and the Poisson's ratio of the membrane were measured.

Figure 2:
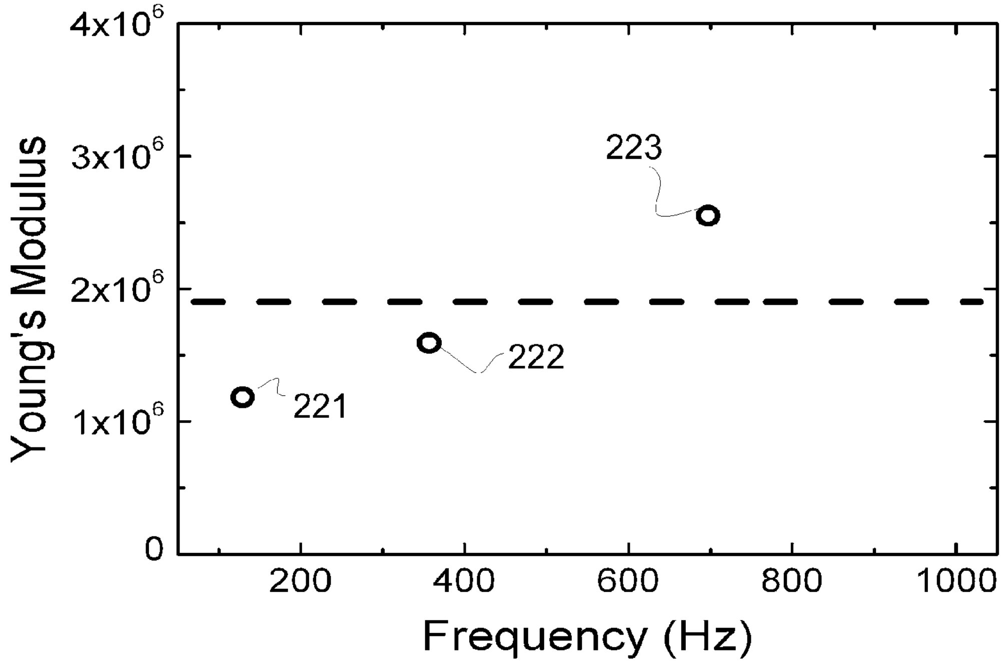
FIG. 2 is a diagram showing Young's module values.

FIG. 2 is a diagram showing Young's module values. Circles 211, 222, 223 denote the Young's modulus E at several frequencies from experimental data. Blue dashed curves denote the average value $1.9\times10^6$ Pa which is the mean value within the relevant frequency range.

The measurement was performed in the "ASTM E-756 sandwich beam" configuration, where the dynamic mechanical properties of the membrane were obtained from the measured difference between the steel base beam (without membrane) properties and the properties of the assembled sandwich beam test article (with the membrane sandwiched in the core of the beam). In the measurement, the shear modulus (μ) data of the membrane at several discrete frequencies could be obtained. The Poisson ratio (ν) of the membrane was found to be around 0.48. Therefore, according to the relation between different elastic parameters, $$E=2\mu(1+\nu),(0.1)$$

the Young's modulus (E) is obtained at those discrete frequencies, shown as circles 211, 222, 223 in FIG. 2. For the sample material the measured E varies from $1.2\times10^6$ Pa to $2.6\times10^6$ Pa within the relevant frequency range. A frequency-independent value of the Young's modulus $E=1.9\times10^6$ Pa (shown as the dashed line in FIG. 2) was chosen so as to simplify the model.

The imaginary part of the Young's modulus is taken to be in the form $\mathrm{Im}(E)=\omega\chi_0$, with the value $\chi_0=7.96\times10^2$ Pa·s obtained by fitting to the absorption. Many eigenmodes are found in the simulations. Out of these, the ones that are left-right symmetric are selected since the non-symmetric ones will not couple to the normally incident plane wave. The resulting absorption peak frequencies are located at 172, 340, and 710 Hz, respectively (indicated by the arrows in FIG. 1A). They are seen to agree very well with the observed peak frequencies.

The insets of FIG. 1A show the cross-sectional profile of the z-displacement w along the x axis, within the unit cell for the three absorption peak frequencies. The circles denote the experimental measured data by laser vibrometer, while the solid curves are the finite-element simulation results. Excellent agreement is seen. But the most prominent feature of the profiles is that while the z-displacement w is continuous at the perimeters of the platelets (whose positions are indicated by the straight sections of the curves where the curvature is zero), there exists a sharp discontinuity in the first-order spatial derivative of w normal to the perimeter. For the low frequency resonance this discontinuity is caused by the "flapping" motion of the two semicircular platelets that is symmetric with respect to they axis; whereas the 712 Hz resonance is caused by the large vibration of the central membrane region, with the two platelets acting as "anchors".

The flapping motion results in a motion of the platelet that is not purely translational along z-axis (defined as out of membrane plane direction). A platelet undergoes flapping motion has different displacement (with respect to its balance position) at different parts. Physically, a flapping motion of the platelet can be viewed as a superposition of translational motion along z-axis, and rotational motion along an axis that is parallel to x-axis.

The characters of these modes also dictate the manner under which their resonance frequencies are tunable: Whereas for the flapping mode the frequency is shown to decrease roughly as the inverse square root of the platelet mass, the membrane vibration mode frequency can be increased or decreased by varying the distance of separation between the two semicircular platelets as depicted in FIG. 2. The intermediate frequency mode is also a flapping mode, but with the two ends of each wing in opposite phase. The asymmetric shape of the platelets enhances the flapping mode.

Another type of unit cell, denoted Sample B, is 159 mm by 15 mm and comprises 8 identical platelets decorated symmetrically as two 4-platelet arrays (with 15 mm separation between the neighboring platelets) facing each other with a central gap of 32 mm Sample B is used to attain near-unity absorption of the low frequency sound at multiple frequencies.

Figure 3:
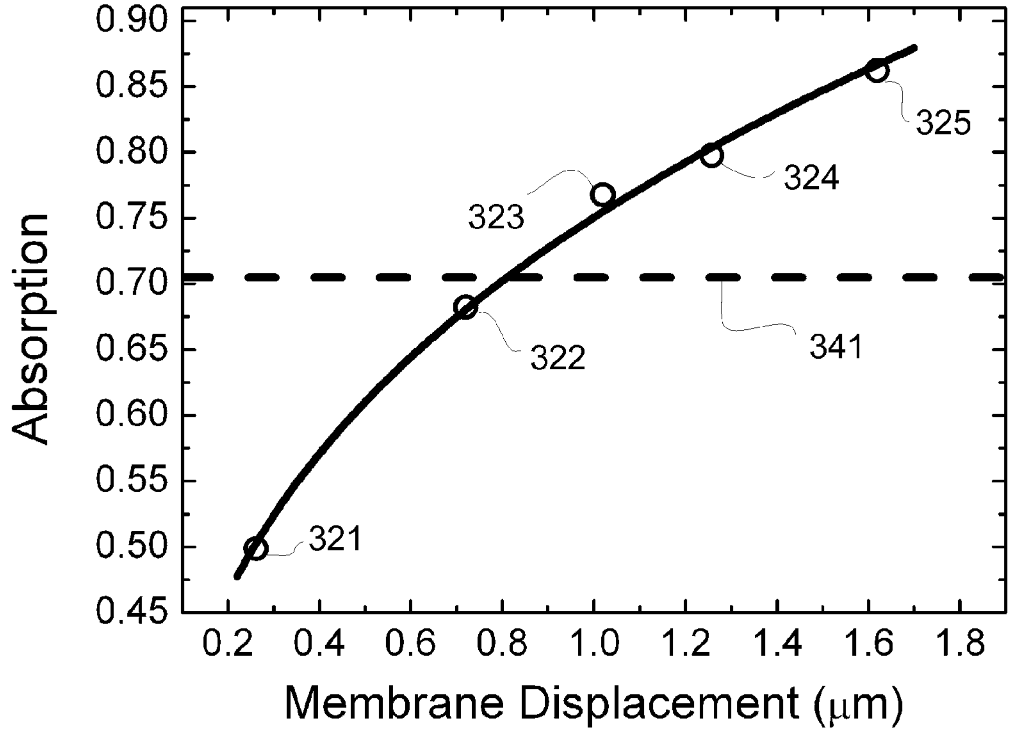
FIG. 3 is a diagram showing absorption vs. membrane displacement for a sample.

FIG. 3 is a diagram showing absorption vs. membrane displacement for Sample B, showing the results of further tuning the impedance of the membrane by placing an aluminum reflector behind the membrane. The aluminum reflector can be placed various near-field distances behind the membrane in accordance with the desired acoustic effect. Circles 321-325 denote experimentally measured absorption coefficient and membrane displacement amplitude at 172 Hz when the distance between the membrane and the aluminum reflector was varied from 7 mm to 42 mm with 7 mm steps. Horizontal dashed line 341 denotes the absorption level when the aluminum reflector is removed, that is, when the distance between the membrane and the aluminum reflector tends to infinity.

In FIG. 3, the absorption at 172 Hz is plotted as a function of the measured maximum normal displacement of the membrane for an incident wave with pressure modulation amplitude of 0.3 Pa. Circles 321-325 each indicate a distances of separation between the membrane and the reflector, varying from 7 mm to 42 mm in steps of 7 mm each. It is seen that adding an air cushion can enhance the absorption, up to 86% at a separation of 42 mm. That is roughly 2% of the wavelength. Moving the reflector further will eventually reduce the absorption to the value without the reflector, as indicated by dashed line 341.

An explanation of the strong absorption can be found by considering the bending wave (or flexural wave) of a thin solid elastic membrane satisfying the biharmonic equation:

$$\nabla^4 w-(\rho h/D)\omega^2 w=0,$$

where $D=Eh^3/12(1-\nu^2)$ is the flexural rigidity and h the thickness of the membrane.

The corresponding elastic curvature energy per unit area is given by:

$$\Omega=\frac{1}{2}D\left[\left(\frac{\partial^2 w}{\partial x^2}\right)^2+\left(\frac{\partial^2 w}{\partial y^2}\right)^2+2\nu\frac{\partial^2 w}{\partial x^2}\frac{\partial^2 w}{\partial y^2}+2(1-\nu)\left(\frac{\partial^2 w}{\partial x\partial y}\right)^2\right]. \quad (1)$$

As Ω is a function of the second-order spatial derivatives of w, when the first-order derivative of w is discontinuous across the edge boundary, it is easy to infer that the areal energy density Ω should have a very large value within the perimeter region (divergent in the limit of a thin shell). Moreover, as the second derivative is quadratic, the integrated value of the total potential energy must also be very large. In the limit of small h, the vibration modes of the system may be regarded as a weak-form solution of the shell model, in the sense that while the biharmonic equation is not satisfied at the perimeter of the platelets (since the higher-order derivatives do not exist), yet besides this set of points with measure zero the solution is still a minimum case of the relevant Lagrangian.

Figure 4:
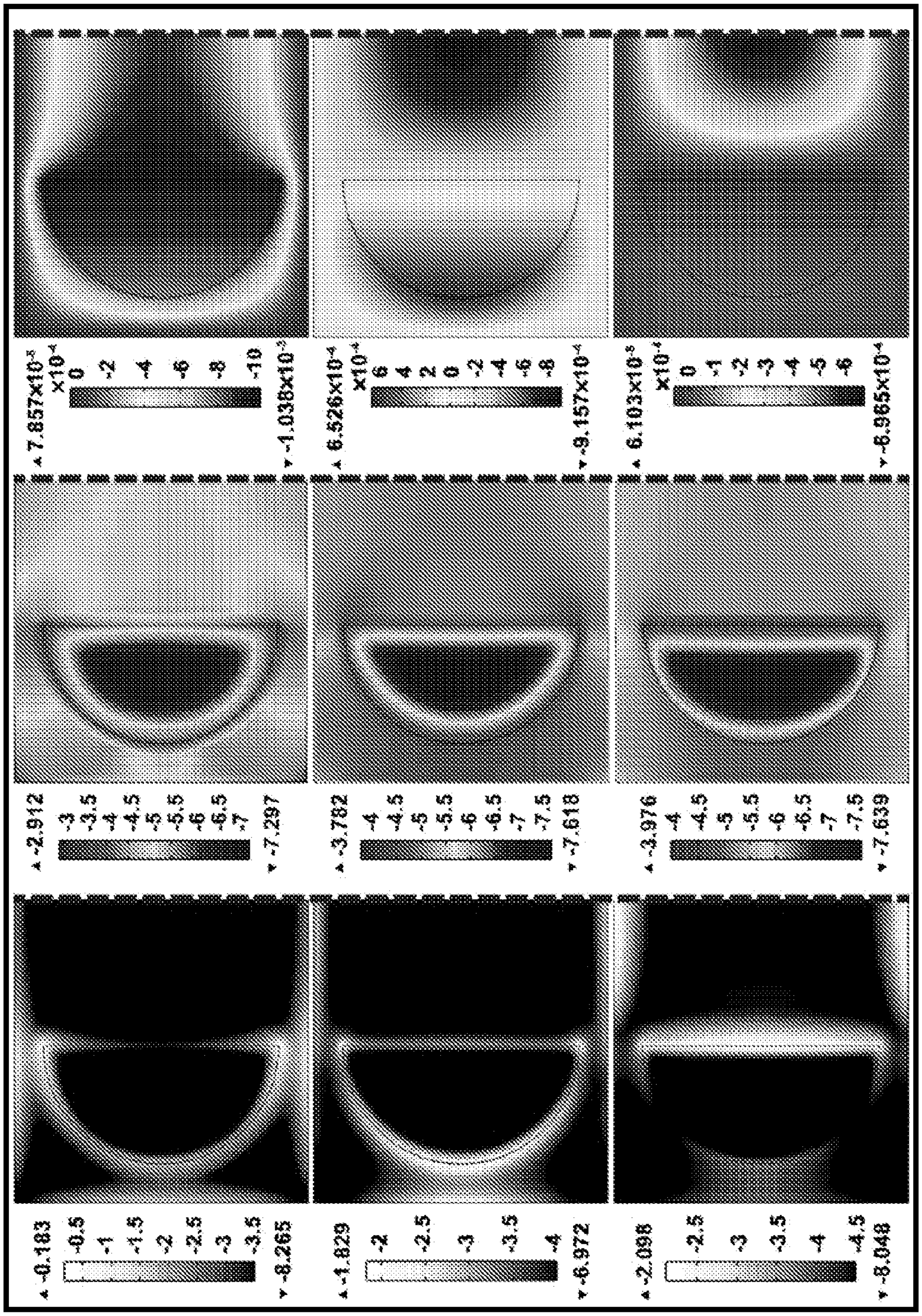
FIG. 4 is a sequence of diagrams showing calculated distributions of the elastic potential energy density (left column), trace of strain tensor (middle column), and displacement w within the xy plane (right column).

FIG. 4 is a sequence of diagrams showing calculated distributions of the elastic potential energy density (left column), trace of strain tensor $\epsilon=\epsilon_{xx}+\epsilon_{yy}+\epsilon_{zz}$ (middle column), and displacement w (right column) within the xy plane. The behavior is the result of the motion of the platelet, which is not purely translational along z-axis. The platelet undergoes flapping motion, and therefore has different displacement with respect to its balance position at different parts. Physically, a flapping motion of the platelet can be viewed as a superposition of translational motion along z-axis, and rotational motion along an axis that is parallel to x-axis. The three rows, from top to bottom, are respectively for the 3 absorption peak frequencies—190 Hz, 346 Hz, and 712 Hz. The left and middle columns' colors bars indicate the relative magnitudes of the quantities in question, with the numbers shown to be the logarithms of the magnitudes, base 10. The right column's color bar is linear in its scale. Since these modes are symmetric with respect to the x coordinate, only the left half is plotted for better visibility. The straight dashed blue lines indicate the mirroring planes.

The predicted large value of Ω within the perimeter region is easily verified as shown in FIG. 4, where a plot is made of the elastic potential energy density U obtained from the COMSOL simulations (left column, where the color is assigned according to a logarithmic scale, base 10) and displacement w (right column) distribution within the xy plane (mid plane of the membrane) around 3 absorption peak frequencies, 190, 346, and 712 Hz (from top to bottom), respectively. The energy density in the perimeter region is seen to be larger than that in other regions by up to 4 orders of magnitudes. There are also high energy density regions at the upper and lower edges of the unit cell, where the membrane is clamped. In the simulations, the integrated energy density U within the perimeter region accounts for 98% (190 Hz), 87% (346 Hz), and 82% (712 Hz) of the total elastic energy in the whole system. As the local dissipation is proportional to the product of energy density with dissipation coefficient, the large multiplying effect implied by the huge energy density can mean very substantial absorption for the system as a whole. This fact is also reflected in the strain distribution around the three absorption peak frequencies, as shown in the middle column of FIG. 4. It is found that the strain in the perimeter region, on the order of $10^{-3}$-$10^{-4}$, is much larger than that in the other parts of the membrane by at least 1-2 orders of magnitude.

In a conventional open system, high energy density is equally likely to be radiated, via transmitted and reflected waves, as to be absorbed. It is noted that in the present case, the small volumes in which the elastic energy is concentrated may be regarded as an "open cavity" in which the lateral confinement in the plane of the membrane is supplemented by the confinement in the normal direction, owing to the fact that the relative motion between the platelets and the membrane contributes only minimally to the average normal displacement of the membrane. Hence from the dispersion relation $k_{\|}^2+k_{\perp}^2=k_o^2=(2\pi/\lambda)^2$ for the waves in air, where the subscripts (∥) and (⊥) denote the component of the wavevector being parallel (perpendicular) to the membrane plane, it can be seen that the relative motions between the platelets and the membrane, which must be on a scale smaller than the sample size $d \ll \lambda$, can only couple to the evanescent waves since the relevant $k_{\|}^2 \gg k_o^2$. Only the average normal displacement of the membrane, corresponding to the piston-like motion, would have $k_{\|}$ components that are peaked at zero and hence can radiate. But the high energy density regions, owing to their small lateral dimensions, contribute minimally to the average component of the normal displacement.

In accordance with the Poynting's theorem for elastic waves, the dissipated power within the membrane can be calculated as $$Q=2\omega^2(\chi_o/E)\int UdV. \quad (2)$$

Absorption is defined as Q/(P·s), where $P=p^2/(\rho c)$ denotes the Poynting's vector for the incident acoustic wave and S is membrane's area, with p being the pressure amplitude. With the previously given parameter values, the absorption at the three resonant frequencies (in the order of increasing frequency) is calculated to be 60%, 29%, and 43%, respectively. It is noted that the calculated values reproduces the relative pattern of the three absorption peaks, although they are smaller than the experimental values by ~10-20%. This discrepancy is attributed to the imperfection in the symmetry of the sample, whereby a multitude of asymmetric vibrational eigenfunctions can be excited by the normally incident plane wave. Together with the width of these modes, they can effectively contribute to a level of background absorption not accounted for in the simulations.

It should be noted that the present membrane-type metamaterials differ from the previous approaches that were based on the different mechanism of anti-resonance occurring at a frequency that is in-between two eigenfrequencies, at which the structure is decoupled from the acoustic wave (and which also coincides with the diverging dynamic mass density), thereby giving rise to its strong reflection characteristic. Without coupling, there is naturally almost no absorption at the anti-resonance frequency. But even at the resonant eigenmode frequencies where the coupling is strong, the measured absorption is still low, owing to the strong coupling to the radiation mode that leads to high transmission. In contrast, for the dark acoustic metamaterials the high energy density regions couple minimally with the radiation modes, thereby leading to near-total absorption as in an open cavity.

Figure 5A:
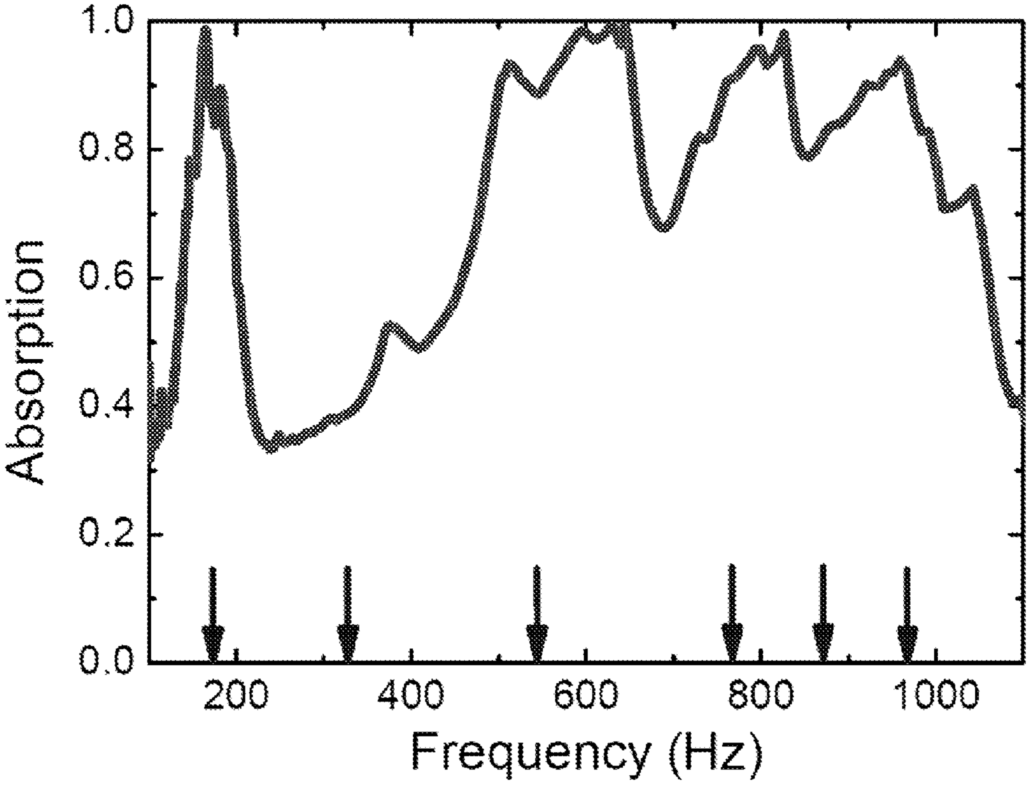
FIG. 5A shows the measured absorption coefficient for a 2 layer sample.
Figure 5B:
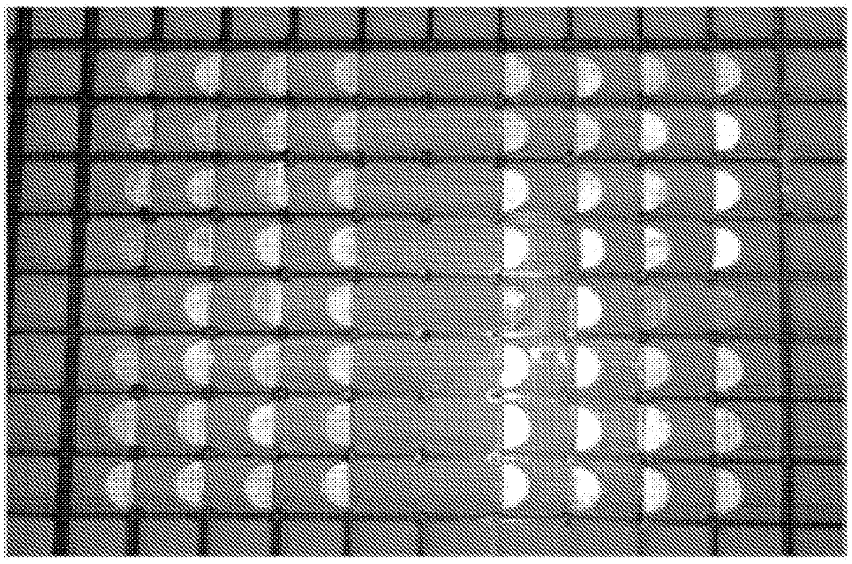
FIG. 5B is a photographic image of the structure.

FIG. 5A shows the measured absorption coefficient for 2 layers of Sample B. A photo image of the array is shown in FIG. 5B. In the measurements, the impedance of the system is tuned by placing an aluminum reflector 28 mm behind the second layer. The distance between the first and second layers was also 28 mm. It can be seen that there are many absorption peaks around 164, 376, 511, 645, 827, and 960 Hz. The absorption peaks at 164 Hz and 645 Hz are seen to be ~99%. By using COMSOL, the absorption peak frequencies for a single layer of Sample B are also calculated. They are located around 170, 321, 546, 771, 872, and 969 Hz, respectively. These are indicated by blue arrows in FIG. 3. Reasonably good agreement with the experimental values is seen, with no adjustable parameters.

The curve indicates the experimentally measured absorption coefficient for 2 layers of Sample B. An aluminum reflector was placed 28 mm behind the second layer. The distance between the first and second layers is also 28 mm. Referring to FIG. 5A, the absorption peaks are located around 164, 376, 511, 645, 827, and 960 Hz, respectively. Blue arrows indicate the positions of the absorption peak frequencies predicted by finite-element simulations. Good agreement is seen.

Figure 6A:
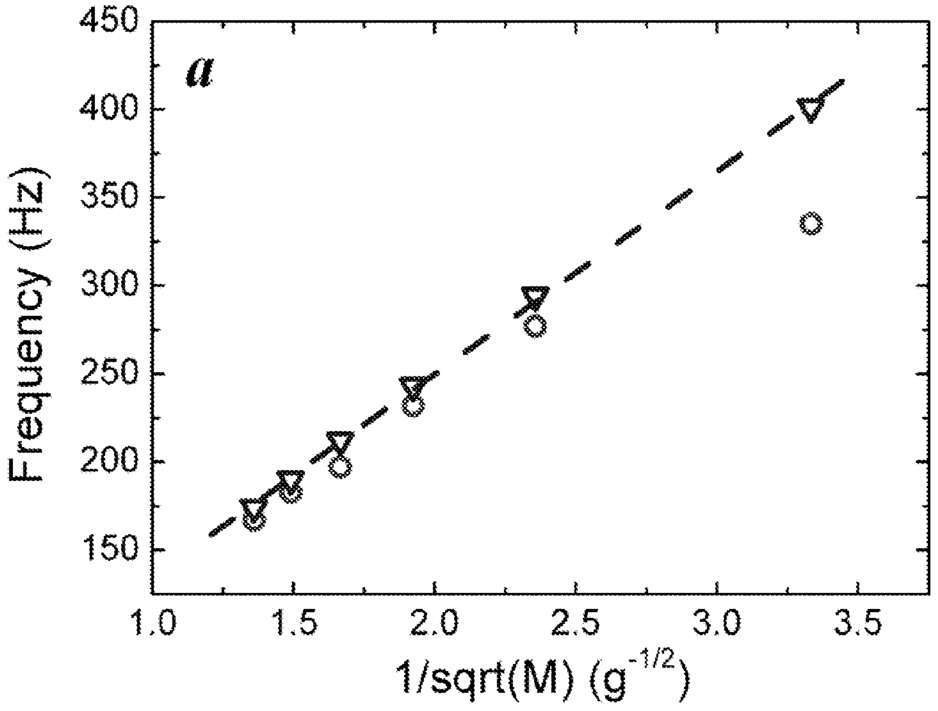
FIGS. 6A and 6B are diagrams showing absorption peaks as an inverse square of mass, at 172 Hz (FIG. 6A) and 813 Hz (FIG. 6*b*).
Figure 6B:
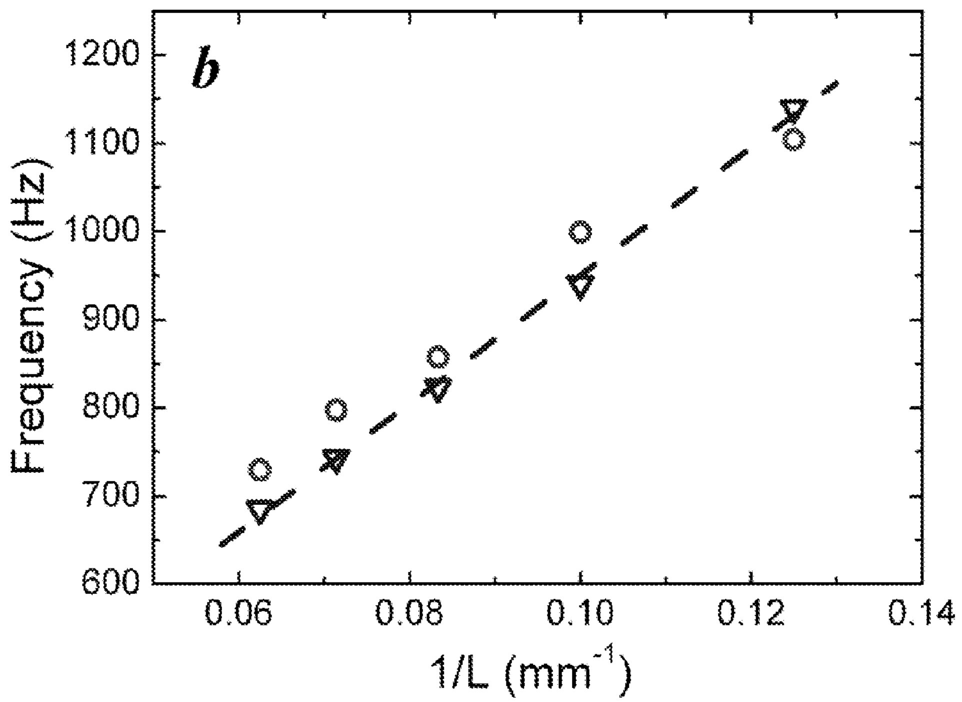

FIGS. 6A and 6B are diagrams showing absorption peaks as an inverse square of mass, at 172 Hz (FIG. 6A) and 813 Hz (FIG. 6*b*). In FIG. 6A, it is seen that the 172 Hz absorption peak moves to higher frequencies as the inverse of the square root of each platelet's mass M. In FIG. 6B, the 813 Hz peak is seen to vary as the inverse separation L between the two platelets. Here the circles denote experimental data, and triangles the simulation results.

Eigenmode Frequencies

To contrast with the previous membrane-type metamaterials that exhibit near-total reflection at an anti-resonance frequency, the mechanism of such metamaterials as well as present their measured absorption performance will be described.

Figure 7A:
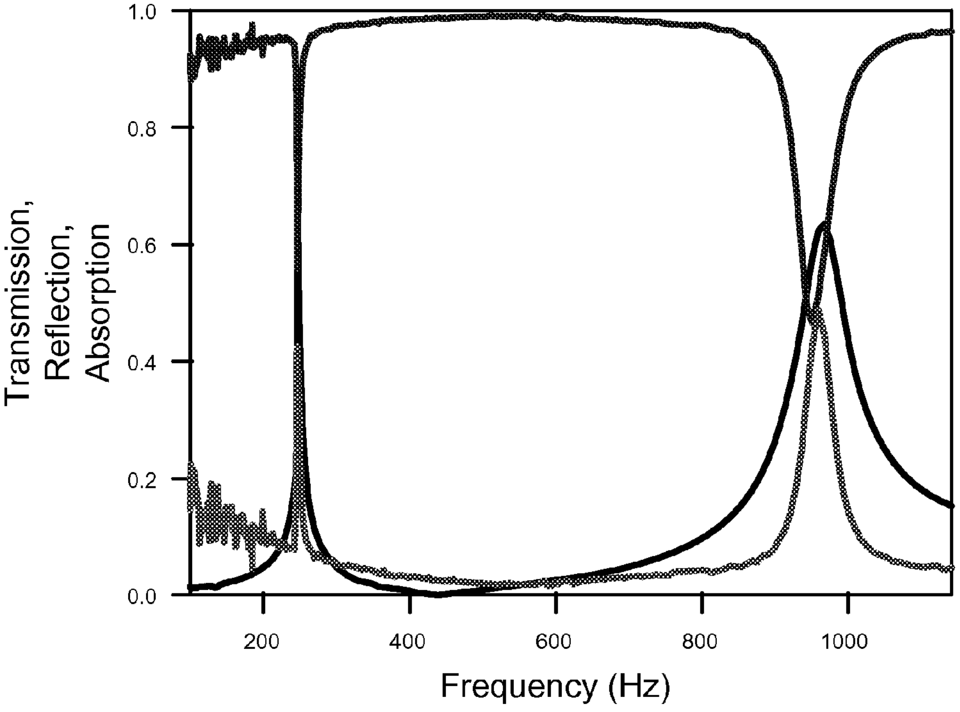
FIG. 7 are diagrams showing absorption for a one-layer membrane (FIG. 7A) and a five layer membrane (FIG. 7A).
Figure 7B:
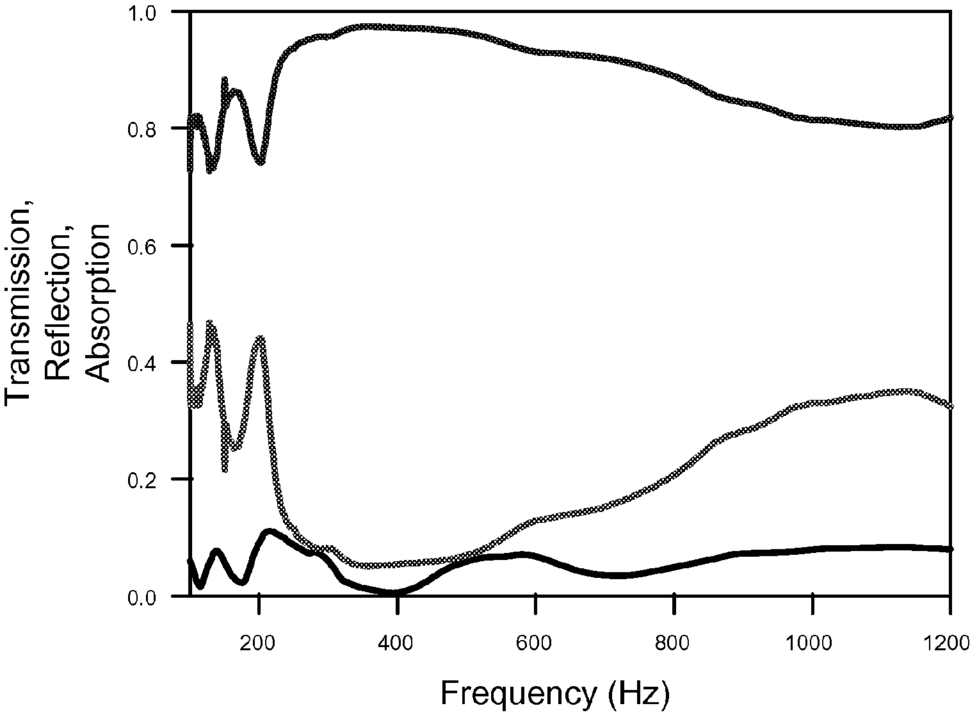

FIGS. 7A and 7B are diagrams showing absorption for a one-layer membrane (FIG. 7A) and a five layer membrane (FIG. 7A). (a) Amplitudes of transmission (dashed curve at top of the graphs in both figures), reflection dotted curve and absorption solid curve) for the one-layer membrane-type metamaterial reflector Strong reflection of sound can occur at a frequency in-between two neighboring resonant (eigenmode) frequencies. In contrast, at the resonant eigenmode frequency the excitation of the eigenmodes can lead to transmission peaks, at the anti-resonance frequency the out-of-phase hybridization of two nearby eigenmodes leads to a near-total decoupling of the membrane structure from the radiation modes. This turns out to also coincide with a divergent resonance-like behavior of the dynamic mass density. Near-total reflection of the acoustic wave is thereby the consequence at the anti-resonance frequency. Since the structure is completely decoupled from the acoustic wave at the anti-resonance frequency, the absorption is naturally very low as shown in FIG. 7A at around 450 Hz. But even at the resonant eigenfrequencies, it is noted that the absorption coefficient for this type of metamaterial is still low, barely reaching 45% at the relatively high frequency of 1025 Hz, which is significantly less that that achieved with the dark acoustic metamaterials. This is attributed to the relatively strong coupling to the radiation modes caused by the piston-like motion of membrane that can lead to high transmission (0.88 at 260 Hz, 0.63 at 1025 Hz).

Even for a five-layer sample 2, the averaged absorption coefficient is a mere 0.22, with maximum value not surpassing 0.45, as shown in FIG. 7B. It is noted that besides the large number of membrane layers, this sample was also sandwiched by two soft panels with holes, with the expressed purpose of enhancing the absorption. Therefore even with these efforts this panel's absorption performance is still way below the dark acoustic metamaterials.

It has been demonstrated that the combined effect of very large curvature energy density at the perimeter of the platelets, in conjunction with its confinement effect, can be particularly effective for subwavelength low frequency acoustic absorption. Since the membrane system has also been shown to be effective in totally reflecting low frequency sound, together they can constitute a system of low frequency sound manipulation with broad potential applications. In particular, lowering the cabin noise in airliners and ships, tuning the acoustic quality of music halls, and environmental noise abatement along highways and railways are some promising examples.

Experimental Set-Up

Measurements of the absorption coefficients shown in FIGS. 1A, 3, and 5 were conducted in a modified impedance tube apparatus comprising two Brüel & Kjær type-4206 impedance tubes with the sample sandwiched in between. The front tube has a loud speaker at one end to generate a plane wave. Two sensors were installed in the front tube to sense the incident and reflected waves, thereby obtaining both the reflection amplitude and phase. The third sensor in the back tube (which is terminated with an anechoic sponge) senses the transmitted wave, to obtain the transmission amplitude and phase. The anechoic sponge has a length of 25 cm, sufficient to ensure complete absorption of the transmitted wave behind the third sensor. The signals from the three sensors are sufficient to resolve the transmitted and reflected wave amplitudes, in conjunction with their phases. The absorption coefficient was evaluated as $A=1-R^2-T^2$, with R and T being the measured reflection and transmission coefficients, respectively. The absorption measurements were calibrated to be accurate by using materials of known dissipation.

The cross-sectional profiles of the z-direction displacement shown in the insets of FIG. 1A were obtained by using the laser vibrometer (Type No. Graphtec AT500-05) to scan the Sample A along the x axis, within the unit cell around the 3 absorption peak frequencies.

Theory and Simulations

The numerical simulation results shown in FIGS. 1A, 2, and 3 were prepared using "COMSOL MULTIPHYSICS", a finite-element analysis and solver software package. In the simulations, the edges of the rectangular membrane are fixed.

An initial stress in the membrane, $\sigma_x^{initial}=\sigma_y^{initial}=2.2\times10^5$ Pa was used in the calculation as the tunable parameter to fit the data. The mass density, Young's modulus and Poisson's ratio for the rubber membrane are 980 kg/m$^3$, $1.9\times10^6$ Pa, and 0.48, respectively. The mass density, Young's modulus and Poisson's ratio for the iron platelets are 7870 kg/m$^3$, $2\times10^{11}$ Pa, and 0.30, respectively. Standard values for air, i.e., $\rho=1.29$ kg/m$^3$, ambient pressure of 1 atm, and speed of sound in air of c=340 m/s, were used. Radiation boundary conditions were used at the input and output planes of the air domains in the simulations.

Absorption at Oblique Incidence

The dark acoustic metamaterials, especially Sample B, can exhibit many resonant eigenmodes. At normal incidence only those eigenmodes with left-right symmetry can be coupled to the incident wave. While imperfections in the sample can cause some coupling with the non-symmetric modes that may be responsible for the higher observed background absorption than that obtained by simulations, it would be interesting to use oblique incidence to purposely probe the consequence of exciting more modes in Sample B.

Figure 8:
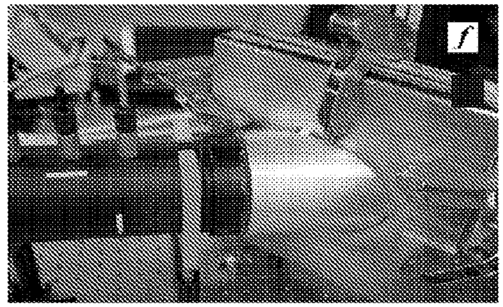
FIG. 8 is an image of an experimental setup for oblique incidence at 45°.
Figure 9A:
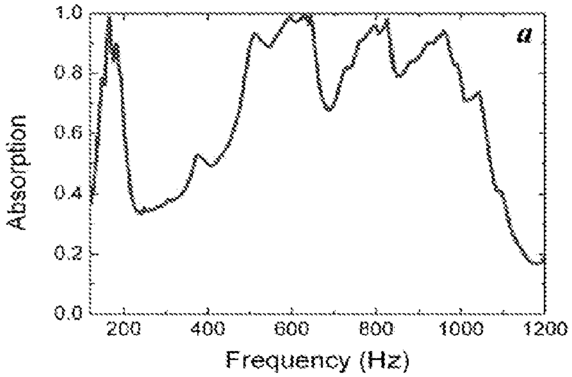
FIG. 9 are diagrams showing absorption coefficients measured for different incident angles: 0° (FIG. 9A), 15° (FIG. 9B), 30° (FIG. 9C), 45° (FIG. 9D), and 60° (FIG. 9E).
Figure 9B:
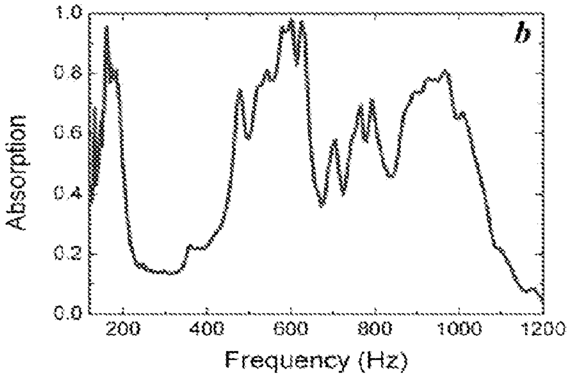
Figure 9C:
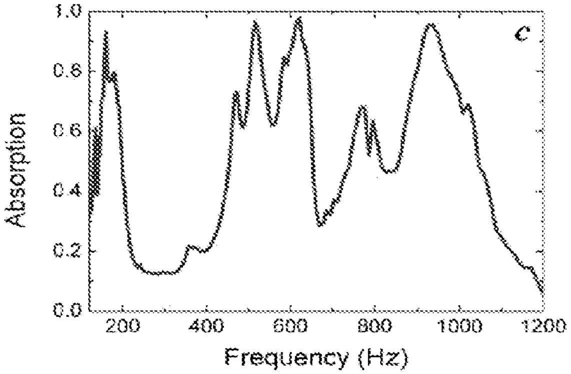
Figure 9D:
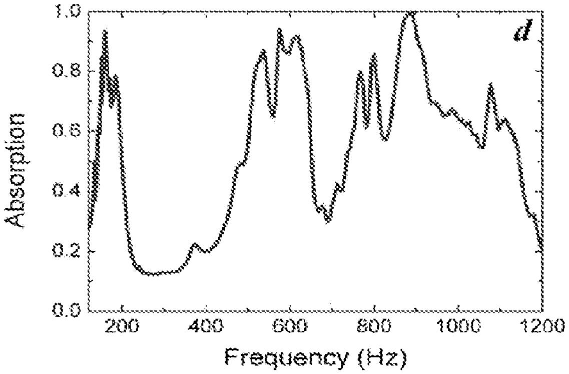
Figure 9E:
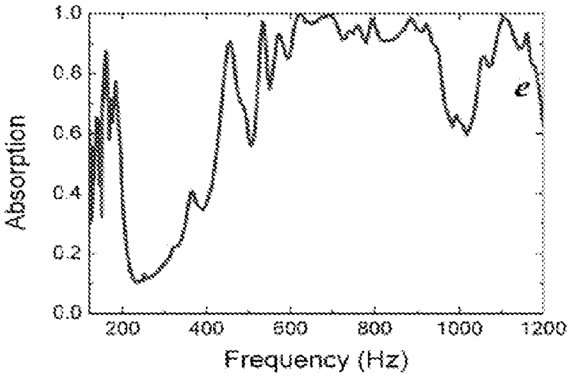

FIG. 8 is an image of an experimental setup for oblique incidence at 45°. This setup can be adjusted for different incident angles in order to test absorption, as depicted in FIGS. 9A-9E. FIG. 9 are diagrams showing absorption coefficients measured for different incident angles: 0° (FIG. 9A), 15° (FIG. 9B), 30° (FIG. 9C), 45° (FIG. 9D), and 60° (FIG. 9E).

Off-normal incidence measurements were carried out with Sample B for 4 oblique incident angles—15°, 30°, 45° and 60°. The experimental setup for oblique incidence is shown in FIG. S4F. The measured absorption coefficients for different angles are shown in FIG. S4A-S4E. The results indicate qualitative similarity up to 60°, at which angle the frequency ranges of 650-950 Hz and 1000-1200 Hz exhibit a pronounced increase in absorption. This is attributed to the fact that large off-normal incident angle can excite many more resonant modes which were decoupled by the left-right symmetry under the condition of normal incidence.

Hence the acoustic metamaterials can actually perform like a limited broad-band, near-total absorber at oblique incidence.

As mentioned earlier, there are many eigenmodes in the system which are decoupled from the normally incident wave owing to its left-right symmetry. In order to explore the consequence when such symmetry is broken, measurements on Sample B were also carried out under oblique incidence. The measured results indicate qualitative similarity up to 60°, at which angle the frequency ranges of 650-950 Hz and 1000-1200 Hz exhibit a pronounced increase in absorption. Thus the overall performance of the dark acoustic metamaterials does not deteriorate under a broad range of incident angles but may even improve within certain frequency regimes.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. An acoustic energy absorption metamaterial comprising:

an enclosed planar frame;

an elastic membrane attached to said frame;

at least one rigid plate attached to said elastic membrane, the rigid plate having an asymmetric shape, with a substantially straight edge at the attachment to said elastic membrane, the rigid plate establishing a cell comprising a predetermined mass, wherein vibrational motions of the structure contain a number of resonant modes with tunable resonant frequencies.

2. An acoustic energy panel comprising the acoustic energy absorption metamaterials of claim 1, wherein adjacent frames face each other with a distance having a predetermined relationship to the size of said frames.

3. The acoustic energy absorption metamaterial of claim 1, wherein the rigid plates have a flapping mode providing a tunable function whereby the frequency decreases in an approximate relationship to the inverse square root of the mass of plates.

4. The acoustic energy absorption metamaterial of claim 1, wherein the rigid plates have a flapping mode providing a tunable function based on the tunable resonant frequencies, said resonant frequencies tunable by varying the distance of separation between asymmetric plates.

5. The acoustic energy absorption metamaterial of claim 1, further comprising at least one aluminum reflector at a predetermined near-field distance behind the membrane.

6. The acoustic energy absorption metamaterial of claim 1, further comprising two plates.

7. The acoustic energy absorption metamaterial of claim 1, wherein the resonance frequency established by the structural units establish at least two eigenfrequencies, and arrangement of the frames establishes a resonant frequency between the two eigenfrequencies established by the frames.

8. The metamaterial of claim 1, wherein the structural units comprise masses subject to vibratory motion and the vibratory motion has a resonant frequency that increases or decreases by varying a distance of separation between adjacent ones of the masses, thereby permitting selection of the resonant frequency as a lossy core between the structural units.

* * * * *